(12) United States Patent
Kräuter et al.

(10) Patent No.: US 7,563,316 B2
(45) Date of Patent: Jul. 21, 2009

(54) METHOD FOR PRODUCING A COLORED SAND COMPOSITION, AND COMPOSITION THEREOF

(75) Inventors: Reinhard Kräuter, Sulzbach-Rosenberg (DE); Michael Flierl, Hirschau (DE)

(73) Assignee: Bene-Fit GmbH, Hirschau (DE)

( * ) Notice: Subject to any disclaimer, the term of this patent is extended or adjusted under 35 U.S.C. 154(b) by 559 days.

(21) Appl. No.: 10/566,738

(22) PCT Filed: Jul. 28, 2004

(86) PCT No.: PCT/EP2004/008412

§ 371 (c)(1),
(2), (4) Date: Jul. 20, 2006

(87) PCT Pub. No.: WO2005/012204

PCT Pub. Date: Feb. 10, 2006

(65) Prior Publication Data

US 2007/0137527 A1 Jun. 21, 2007

(30) Foreign Application Priority Data

Aug. 1, 2003 (DE) ................. 103 35 427

(51) Int. Cl.
| | |
|---|---|
| C09C 1/02 | (2006.01) |
| A63C 5/08 | (2006.01) |
| A63C 17/12 | (2006.01) |
| B62D 61/06 | (2006.01) |
| B62K 5/02 | (2006.01) |
| B62D 61/00 | (2006.01) |
| B62D 61/02 | (2006.01) |
| B62K 11/00 | (2006.01) |
| B62M 7/00 | (2006.01) |
| B62M 13/00 | (2006.01) |
| B60K 17/356 | (2006.01) |

(52) U.S. Cl. ............. 106/466; 427/180; 427/212; 427/218; 427/204; 427/215; 427/221; 427/242

(58) Field of Classification Search ............ 106/466
See application file for complete search history.

(56) References Cited

U.S. PATENT DOCUMENTS

| 2,001,448 A | 5/1935 | Beasley |
| 3,208,871 A | 9/1965 | Langseth et al. |
| 4,851,049 A | 7/1989 | Wienand |
| 6,743,766 B1 | 6/2004 | Bauer et al. |

FOREIGN PATENT DOCUMENTS

| DE | 4018619 | 9/1991 |
| DE | 4442077 | 5/1996 |
| WO | WO 99/01398 | 1/1999 |

*Primary Examiner*—Jerry Lorengo
*Assistant Examiner*—Pegah Parvini
(74) *Attorney, Agent, or Firm*—Black Lowe & Graham, PLLC

(57) ABSTRACT

The invention relates to a method for producing a coloured sand composition containing a large number of silica sand grains with outer coatings of colour pigments, wherein the method comprises the following steps:

mixing caustic soda and water in a predetermined ratio, preferably of 1:2, to form a dilute caustic soda;

mixing boric acid in a predetermined concentration with the dilute caustic soda to form a boric acid/caustic soda solution;

mixing a binder with the boric acid/caustic soda solution in a predetermined ratio to form a coating mixture;

coating the silica sand grains coated with the colour pigments with the coating mixture by adding the coating mixture to the silica sand grains, and indirectly heating the silica sand grains coated with the coating mixture in a system which is spatially sealed from the heating source by means of separate chambers for the heating process and the heating source.

A coloured sand composition is also described.

8 Claims, No Drawings

METHOD FOR PRODUCING A COLORED SAND COMPOSITION, AND COMPOSITION THEREOF

DESCRIPTION

The invention relates to a method for producing a coloured sand composition and to the composition thereof, according to the preambles of claims 1 and 8.

Coloured sand compositions, which contain a large number of silica sand grains with outer coatings of colour pigments, are known for example from DE 38 26 877 A1. Such coloured sands usually comprise silica sand grains which are coated on the outside with colour pigments. The colour pigments can be durably bound to the silica sand grains by means of alkali silicates—also referred to as water glasses—and a baking process. During such a baking process, which leads to calcination of the silica, a chemical bond is produced between water-soluble glass-type solids, which represent a selected water glass, and the silica sand grains.

It has been found that such chemical bonds are not permanent, that is to say fractions of the water glass detach again from the silica sand grains over time, in particular upon contact with water. This leads inter alia to the detachment of colour pigments from the surface of the silica sand grains. In particular, the detachment of the fractions of water glass results in an increase in the pH value within the coloured sand composition, and this is undesirable in the case of further processing of the coloured silica sand.

In order to prevent such dissolution and detachment of the water glass layer from the silica sand grains, the baking temperature must be increased. Water glass layers produced in this way exhibit much improved adhesion and lower solubility in water. They also react with water in a much less alkaline way. However, such a method requires an increased energy outlay. Moreover, at such high temperatures, the colour pigments used are at least partially no longer stable in terms of colour, and this leads to undesirable colour shifts.

Accordingly, the object of the present invention is to provide a method for producing a coloured sand composition, and the composition thereof, by means of which longer-lasting adhesion of the water glass layers and of the colour pigments to the surface of the silica sand grains is achieved along with an improved pH stability of the coloured sand composition.

This object is achieved in terms of the method by the features of claim 1 and in terms of the substance by the features of claim 8.

One essential point of the invention is that, in a method for producing a coloured sand composition containing a large number of silica sand grains with outer coatings of colour pigments, the following steps are carried out:

mixing caustic soda and water in a predetermined ratio, preferably of 1:2, to form a dilute caustic soda;

mixing boric acid in a predetermined concentration with the dilute caustic soda to form a boric acid/caustic soda solution;

mixing a binder, in particular sodium water glass, with the boric acid/caustic soda solution in a predetermined ratio to form a coating mixture;

coating the silica sand grains coated with the colour pigments with the coating mixture by adding the coating mixture to the silica sand grains, and indirectly heating the silica sand grains coated with the coating mixture in a system which is spatially sealed from the heating source by means of separate chambers for the heating process and the heating source.

By virtue of the additional use of boric acid at a concentration of more than 99.9% by mass $H_3BO_3$, use is made in the coating mixture of a mixing component which is poorly soluble in water. By contrast, such a technical-grade boric acid dissolves very well in the dilute caustic soda. By suitably metering in the quantity of boric acid to be added to the dilute caustic soda in a substoichiometric ratio, it is possible to achieve a predeterminable partial neutralization of the boric acid on account of a saturation that takes place. By way of example, the boric acid concentration lies in a range at which 1 to 2 free protons remain per boric acid molecule following addition of the boric acid to the dilute caustic soda, and these protons, during the subsequent addition of water glass as binder, can bind the sodium ions of the latter. This results in longer-lasting binding of the water glass to the silica sand grains.

The subsequent binding of sodium ions from the water glass to the 1 to 2 free protons of the boric acid molecules is assisted by the indirect, that is to say passive, heating of the silica sand grains coated with the coating mixture in a system which is spatially sealed from the heating source by means of separate chambers. This is because, on account of the separate arrangement of chambers for the heating process and the heating source, direct contact of combustion gases with the coloured sand composition according to the invention which is to be baked is avoided, and this prevents contact between $CO_2$ gases and sodium ions of the coloured sand composition. This advantageously prevents the formation of $Na_2CO_3$ molecules within a baking chamber, as was previously known, and the associated increase in the pH values of the coloured sand composition.

Preferably, such indirect heating, as may be carried out for example by means of a passively heated muffle kiln or a passively heated rotary kiln, is carried out at a temperature within a temperature range of 300° C.-900° C., preferably at a temperature of approximately 400° C. Ideally, the system which is sealed from the heating source is designed in such a way that no foreign gases caused by the heating process, that is to say gases which cannot be attributed to the coloured sand composition, come into contact with the coloured sand composition to be baked.

According to one preferred embodiment, in the step of mixing caustic soda with water, the caustic soda is stirred into the water and dissolved therein. This leads to an optimized mixing of caustic soda and water.

The step of mixing the boric acid with the dilute caustic soda is carried out only following the elapse of a cooling period in which the dilute caustic soda, which has been considerably heated by the previous mixing step, is cooled.

The boric acid/caustic soda solution has a boric acid content of 35.7% by mass and a density of 1.4-1.6 g/cm$^3$.

According to one preferred embodiment, the ratio of boric acid/caustic soda solution to sodium water glass is in a range from 1:2-1:6, but is preferably 1:3.6.

A coloured sand composition according to the invention containing a large number of silica sand grains with outer coatings of colour pigments advantageously contains surface layers baked onto the silica sand grains, said surface layers consisting of a coating mixture which contains caustic soda and water in a predetermined ratio, boric acid in a predetermined concentration, and sodium water glass. The ratio between caustic soda and water is within a range of 1:1-1:5, preferably 1:2, and leads to a dilute caustic soda. The boric acid is in turn mixed with the dilute caustic soda in a ratio within a range of 1:1-1:5, preferably 1:1.8, to form a boric acid/caustic soda solution. The boric acid/caustic soda solution is in turn mixed with the sodium water glass in a ratio within a range of 1:1-1:6, preferably 1:3.6, to form the coating mixture. Such mixing ratios advantageously lead to a coloured sand composition which exhibits a stable pH value even after a baking process and which does not experience any subsequent detachment of fractions of water glass from the silica sand grains upon contact with water.

It has proven advantageous if the sodium water glass has a $SiO_2$ content of 27.3% by mass, a $Na_2O$ content of 8.2% by mass and a $H_2O$ content of 64.5% by mass.

Examples of embodiments of the invention will be described below with reference to test results shown in tables:

150 g of technical-grade caustic soda (NaOH) is dissolved in 300 g of water with stirring in a water bath. Once the greatly heated mixture has cooled, 250 g of technical-grade boric acid with an acid content of 99.9% by mass $H_3BO_3$ is dissolved in this dilute caustic soda. The resulting boric acid/caustic soda solution has a proportion by mass of 35.7% by mass of boric acid and a density of 1.496 g/cm³.

The boric acid/caustic soda solution is then mixed with the binder, sodium water glass, at room temperature. The sodium water glass has a ratio of $SiO_2$ to $Na_2O$ of 3.3:1 and consists of 8.2% by mass $Na_2O$, 27.3% by mass $SiO_2$ and 64.5% by mass $H_2O$.

To produce coloured silica sand, this is firstly mixed, as silica sand grains, with colour pigments in the dry state. Mixtures of various colour pigments may also be used. Such a mixing operation takes place in a laboratory mixer by homogenization of the mass. Then, for each 1 kg of silica sand grains, a coating mixture consisting of 18 g of sodium water glass and 5.0 g of boric acid/caustic soda solution is added to the silica sand by means of the laboratory mixer, in which the mixture is stirred for approximately 2 minutes.

Subsequent indirect heating at a minimum of 450° C. in a passively heated muffle kiln produces calcination of the silica sand grains by means of the coating mixture, and this leads to a high pH stability of the coloured sand composition over a long period of time.

Table 1 low shows a total of 6 coloured sand compositions, each of which contains 1.8% by mass of added sodium water glass and has different boric acid concentrations.

TABLE 1

| Sample No. | Water glass/ kg QS | $H_3BO_3$ solution | Boil test | pHimm. | pH7d | pH28d | Temp. |
|---|---|---|---|---|---|---|---|
| 1 | 1.8% | 0.1% | good | 7.5 | 7.9 | 9.7 | 450° C. |
| 2 | 1.8% | 0.25% | good | 6.7 | 7.6 | 9.2 | 450° C. |
| 3 | 1.8% | 0.50% | average | 6.8 | 7.5 | 8.8 | 450° C. |
| 4 | 1.8% | 1.00% | average | 7.3 | 6.8 | 7.8 | 450° C. |
| 5 | 1.8% | 1.50% | average | 8.6 | — | 8.7 | 450° C. |
| 6 | 1.8% | 2.00% | poor | 9.2 | — | 9.2 | 450° C. |

It can clearly be seen from Table 1 that both too low a boric acid content and too high a boric acid content lead to a lower pH stability of the coloured sand composition as a whole. This can clearly be seen by comparing the three columns for the pH value at the time of mixing (and calcination immediately thereafter: pHimm.), 7 days after the time of mixing (and calcination immediately thereafter: pH7d) and 28 days (pH28d) after the time of mixing with calcination immediately thereafter.

Like Table 1, Table 2 also shows various coloured sand composition samples with different boric acid contents and in each case a water glass content of 1.8% by mass. The pH of coloured sand composition sample V3 was at a relatively low value of 7.1 after 28 days and continued to be observed for a further period of 90, 360 and 840 days. This showed a pH value of 8.1 after 90 days, 9.0 after 360 days and 8.1 after 840 days. This result clearly shows an increased pH stability compared to samples without boric acid solution or with a different boric acid content.

TABLE 2

| Sample name | $H_3BO_3$ solution | Boil test | pHimm. | pH7d | pH28d | Water glass/ kg QS |
|---|---|---|---|---|---|---|
| brick red 5/8 V 1 | 0.10% | average | 8.4 | 9.9 | 9.6 | 1.8% |
| brick red 5/8 V 2 | 0.20% | average | 7.2 | 8.1 | 9.2 | 1.8% |
| brick red 5/8 V 3 | 0.40% | good | 7.3 | 7.5 | 7.1 | 1.8% |
| brick red 5/8 V 4 | 0.30% | poor | 7.6 | 8.9 | 8.5 | 1.8% |

Table 3 below shows, for a comparative study of the pH values for a period of 0, 6 and 30 days, that an increased pH stability is obtained in the case of samples V4 and V5.

TABLE 3

| Sample name | Water glass/ kg QS | $H_3BO_3$ solution (concentr.) | Boil test | pH imm. | pH6d | pH30d |
|---|---|---|---|---|---|---|
| 17.08.00/V1 | 18 g | 1.0 g | very good-good | 7.1 | 9.1 | 9.5 |
| 17.08.00/V2 | 18 g | 2.0 g | good | 6.7 | 8.3 | 9.1 |
| 17.08.00/V3 | 18 g | 3.0 g | good | 7.1 | 7.9 | 8.8 |
| 17.08.00/V4 | 18 g | 4.0 g | good | 7.1 | 7.3 | 8.6 |
| 17.08.00/V5 | 18 g | 5.0 g | good-average | 7.1 | 7.3 | 7.1 |

For samples V4 and V5, further pH observations gave the following results: The sample V4 had a pH of 8.0 after 240 days, 8.9 after 360 days and 6.1 after 840 days. The sample V5 had a pH of 7.6 after 80 days, 7.5 after 240 days, 8.5 after 360 days and 5.7 after 840 days. Accordingly, pH stability over a period of at least 2 years is possible given optimized adaptation of the boric acid content, water glass content and baking temperature for a baking process within a passively heated rotary kiln or muffle kiln.

Table 4 shows a comparison of coloured sand composition samples in which various baking temperatures of 450° C.-510° C. were used at different boric acid contents of 2.0 g/kg and 4.0 g/kg. Subsequent observation of the pH showed that better pH stability can be achieved at relatively high baking temperatures. Better pigment adhesion to the surface of the coloured sand grains is also obtained. Such improved pigment adhesion is also assisted by the use of a passively heated rotary kiln, which results in the side effect of gentler pigmentation. This in turn leads to it being possible for higher baking temperatures to be used during the baking process.

TABLE 4

| Date/sample name | $H_3BO_3$ solution (concentr.) | Temp. | Boil test | pH 1d | pH 7d | pH30d | pH 110d | pH 260d |
|---|---|---|---|---|---|---|---|---|
| 24.08.00/V 1 | 2.0 g/kg | 450° | average | 8.3 | 7.7 | 7.7 | 9.2 | |
| 24.08.00/V 2 | 2.0 g/kg | 480° | average | 7.4 | 7.6 | 8.1 | 9.2 | |
| 24.08.00/V 3 | 2.0 g/kg | 510° | good | 7.0 | 7.0 | 7.2(50d) | 6.6 | |
| 24.08.00/V 4 | 4.0 g/kg | 450° | average | 7.3 | 7.1 | 7.3(50d) | 6.8 | 7.0 |
| 24.08.00/V 5 | 4.0 g/kg | 480° | average | 7.2 | 7.0 | 7.3(50d) | 6.6 | |
| 24.08.00/V 6 | 4.0 g/kg | 510° | good | 7.0 | 6.8 | 6.6(50d) | 6.4 | |

It can be seen from Table 5 below that different pH values can be achieved in coloured sand composition samples with different amounts of water glass solution in which in each case three different amounts of boric acid of 2.0, 4.0 and 6.0 g were used.

TABLE 5

| Date/solution no. | $H_3BO_3$ solution | Boil test | pHimm. | pH8d | pH30d | pH210d |
|---|---|---|---|---|---|---|
| 16.10.00/No. 6 | 2.0 g | good | 9 | 9.5 | — | |
| | 4.0 g | good | 7.4 | 7.4 | 8.5 | 7.3 |
| | 6.0 g | average | 8.4 | 8.6 | — | |
| 16.10.00/No. 7 | 2.0 g | good | 9.1 | 9.4 | — | |
| | 4.0 g | average | 8.7 | 8.8 | — | |
| | 6.0 g | good | 7.6 | 8.6 | — | |
| 16.10.00/No. 9 | 2.0 g | good | 9.2 | 8.9 | — | 8.4 |
| | 4.0 g | good | 7.4 | 7.7 | 8.8 | 7.1 |
| | 6.0 g | good | 8.8 | 8.3 | 8.7 | 7.7 |
| 16.10.00/No. 10 | 2.0 g | good | 9.5 | 9.3 | — | |
| | 4.0 g | good | 8.9 | 8.2 | 9 | |
| | 6.0 g | good | 8.9 | 8.3 | 8.7 | |
| 16.10.00/No. 12 | 2.0 g | good | 9 | 9.7 | — | |
| | 4.0 g | good | 8.6 | 8.7 | — | |
| | 6.0 g | good | 8.1 | 8.8 | — | |
| 17.10.00/No. 13 | 2.0 g | good | 9.4 | 9.6 | — | |
| | 4.0 g | good | 8.4 | 9 | — | |
| | 6.0 g | good | 7 | 8.4 | — | |
| 17.10.00/No. 14 | 2.0 g | good | 9.6 | 9.6 | — | |
| | 4.0 g | good | 9.5 | 9.1 | — | |
| | 6.0 g | good | 9.1 | 9.3 | — | |

Table 6 below shows the dependence of the pH value on the type of pigments used, the amount of pigment and the baking temperature.

TABLE 6

| Date/sample | Pigment | t in ° C. | Boil test | pH 12d | pH50d |
|---|---|---|---|---|---|
| 08.02.01/V 1 | 10g PK 3095 | 450 | average | 7.9 | 8.6 |
| 08.02.01/V 2 | 10 g PK 3095 | 500 | average | 7.0 | 7.8 |
| 08.02.01/V 3 | 10 g PK 3095 | 550 | average | 6.8 | 6.7 |
| 08.02.01/V 4 | 10 g PK 3095 | 600 | average | 6.7 | 6.9 |
| 08.02.01/V 5 | 15 g Bayf 303T | 450 | poor | 8.1 | 8.3 |
| 08.02.01/V 6 | 15 g Bayf 303T | 500 | average | 6.9 | 7.1 |
| 08.02.01/V 7 | 15 g Bayf 303T | 550 | good | 6.5 | 7.0 |
| 08.02.01/V 8 | 15 g Bayf 303T | 600 | good | 6.6 | 7.0 |

In summary, the result of the extensive tests has shown the ideal composition to be a quantity of Na water glass of 18 g for each 1 kg of silica sand grains and 5 g of boric acid/caustic soda solution. The boric acid/caustic soda solution contains 30 g of $H_2O$, 15 g of NaOH and 25 g of $H_3BO_3$ with a total weight of 70 g.

It can be seen from Tables 7, 8 and 9 below that, depending on the baking temperature used, different pH stabilities can be achieved for different amounts of water glass solution and different binders, that is to say binders other than sodium water glass.

TABLE 7

| Name/date | Binder | Temperature | Boil test | pH value | pH 30d |
|---|---|---|---|---|---|
| orange/9 12.02.03/V 4 | coating mixture | 500° C. | good | 6.4 | 6.1 |
| orange/9 12.02.03/V 5 | coating mixture | 650° C. | very good | 6.0 | 6.1 |

TABLE 8

| Date/name | Binder | Temp. | Boil test | pH value |
|---|---|---|---|---|
| orange-brown 173/D, from prod. (=V0) | 2.0% sodium water glass | 380° | quite poor | 9.9 |
| orange-brown 173/D, 27.02.03/V1 | coating mixture | 400° | much better | 6.9 |
| orange-brown 173/D, 27.02.03/V2 | coating mixture | 500° | good | 6.1 |
| orange-brown 173/D, 27.02.03/V3 | coating mixture | 600° | very good | 6.3 |

TABLE 9

| Date/name | Binder | Temp. | Boil test | pH value |
|---|---|---|---|---|
| red-orange 172/D, from prod. (=V0) | 2.0% sodium water glass | 380° | poor | 9.8 |
| red-orange 172/D, 05.03.03, V 1 | coating mixture | 400° | much better | 6.8 |
| red-orange 172/D, 05.03.03, V 2 | coating mixture | 500° | good | 6.5 |
| red-orange 172/D, 05.03.03, V 3 | coating mixture | 600° | very good | 5.9 |

Both too low a boric acid content and too high a boric acid content can lead to a lower pH stability, so that, depending on the other parameters, the optimal amount of boric acid had to be determined by means of numerous tests. It was found that the coloured sand composition according to the invention depended on the following parameters:
- amount of boric acid solution
- amount of caustic soda for dissolving the boric acid
- water content within the boric acid/caustic soda solution
- concentration of the water glass solution
- stoichiometric ratio of $SiO_2$ and alkali oxide in the water glass
- type of water glass (either $Na_2O$ or $K_2O$)
- ratio of boric acid/caustic soda solution to amount of water glass
- amount of $CO_2$ within the baking chamber
- calcination temperature
- ratio between amount of water glass and amount of silica sand grains.

What is claimed is:

1. A method for producing a colored sand composition containing a plurality of silica sand grains with outer coatings of a color pigment, the method comprising:
    mixing the plurality of silica sand grains with at least one dry color pigment to produce a sand pigment mixture;
    mixing a caustic soda and water to form a dilute caustic soda solution;
    mixing boric acid with the dilute caustic soda solution to form a boric acid/caustic soda solution;
    mixing a binder with the boric acid/caustic soda solution to form a coating solution;
    covering the sand pigment mixture with the coating solution; and
    heating the covered sand pigment mixture to produce the silica sand grains having an outer pigment coating.

2. The method of claim 1, wherein heating includes heating without adding gases in an indirect heating chamber within a temperature range of 300° C. to 900° C.

3. The method of claim 1, wherein the binder includes sodium water glass.

4. The method of claim 1, wherein mixing boric acid with the dilute caustic soda includes allowing the boric acid/caustic soda solution to cool after combining the boric acid with the dilute caustic soda solution.

5. The method of claim 1, wherein the boric acid/caustic soda solution has a boric acid content approximately 35.7% by mass and a density between approximately 1.4 and 1.6 g/cm³.

6. The method of claim 1, wherein the boric acid content is partially neutralized by the dilute caustic soda and at least one or two free protons are produced per boric acid molecule.

7. The method of claim 3, wherein the ratio of boric acid/caustic soda solution to sodium water glass is approximately between 1:2 to 1:6.

8. The method of claim 7, wherein the ratio of boric acid/caustic soda solution to sodium water glass is 1:3.6.

* * * * *

UNITED STATES PATENT AND TRADEMARK OFFICE
CERTIFICATE OF CORRECTION

| | | |
|---|---|---|
| PATENT NO. | : 7,563,316 B2 | Page 1 of 1 |
| APPLICATION NO. | : 10/566738 | |
| DATED | : July 21, 2009 | |
| INVENTOR(S) | : Krauter et al. | |

It is certified that error appears in the above-identified patent and that said Letters Patent is hereby corrected as shown below:

Title page, item (87) should read -- PCT Pub Date: February 10, 2005 --

Signed and Sealed this

Twentieth Day of October, 2009

David J. Kappos
*Director of the United States Patent and Trademark Office*